No. 636,061. Patented Oct. 31, 1899.
P. PITTON.
BICYCLE TIRE.
(Application filed Apr. 7, 1899.)
(No Model.)
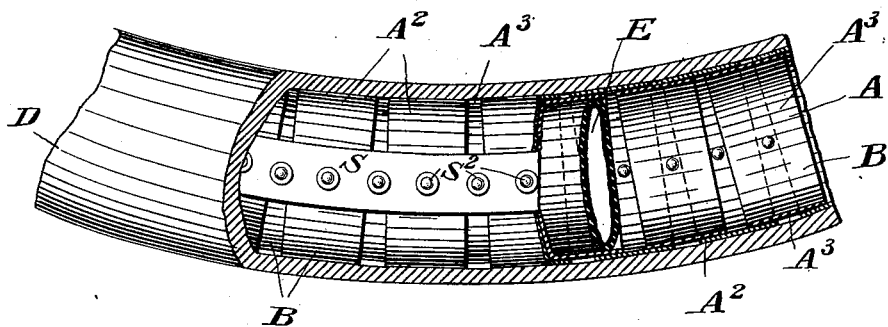
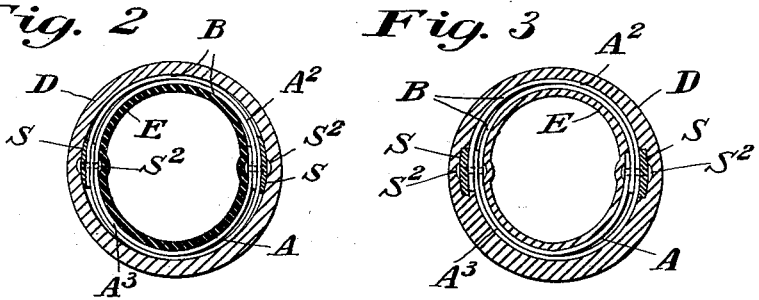
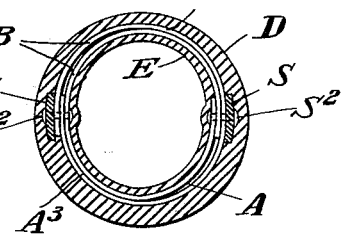
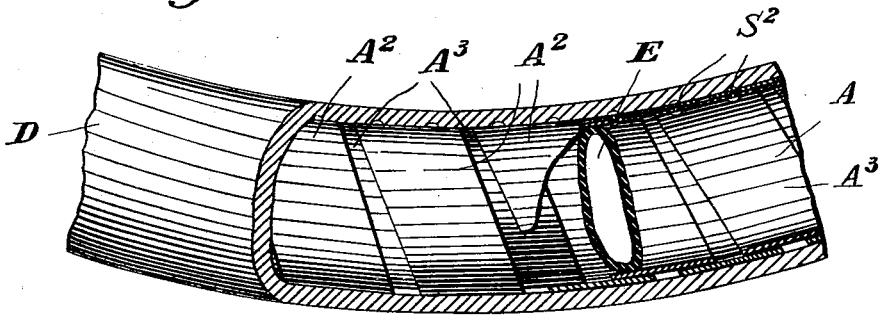
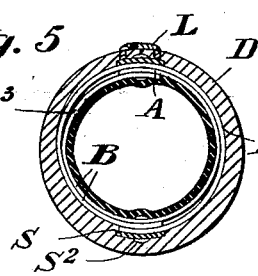
Witnesses
Charles F. Spiegel
K. Smith
Inventor
Philip Pitton
per
Wm. Hubbell Fisher
Attorney
THE NORRIS PETERS CO., PHOTO-LITHO., WASHINGTON, D. C.

UNITED STATES PATENT OFFICE.

PHILIP PITTON, OF CINCINNATI, OHIO.

BICYCLE-TIRE.

SPECIFICATION forming part of Letters Patent No. 636,061, dated October 31, 1899.

Application filed April 7, 1899. Serial No. 712,099. (No model.)

*To all whom it may concern:*

Be it known that I, PHILIP PITTON, a citizen of the United States, and a resident of the city of Cincinnati, in the county of Hamilton and State of Ohio, have invented certain new and useful Improvements in Tires for the Wheels of Bicycles and other Vehicles, of which the following is a specification.

The several features of my invention and the various advantages resulting from their use conjointly or otherwise will be apparent from the following description and claims.

In the accompanying drawings, making a part of this application, and in which similar letters of reference indicate corresponding parts, Figure 1 is a view of a part of a tire, illustrating my invention, the outer cover being in part broken away and the metallic tubing being also broken away and the inner tube being also broken off. By the removal of such parts at various points the construction of the tire and the several parts are more fully exhibited. Fig. 2 is a transverse section of the tire shown in Fig. 1. Fig. 3 shows a transverse section of a modified combination forming the tire, the modification relating to the cover, and flexible tube within the elastic tubing. Fig. 4 shows a tire whose cover and inner tube are similar to those shown in Fig. 1, but whose tubular metallic support is substantially continuous, as hereinafter mentioned. Fig. 5 shows a transverse section of the tire shown in Figs. 1 and 2, with the following exception—viz., that in the present figure the strips connecting the annular parts or rings of the metallic tubular support are located the one at the outermost portion of the peripheral surface of the tube when the latter is curved in a circle and the other is located at the inner portion of the circle.

I will now proceed to describe my invention in detail.

The tire is in general tubular. There is present a continued cylinder A, of elastic metal. This cylinder is made of strips of metal arranged in concentric layers. Thus there is an outer layer $A^2$ of metal and an inner layer $A^3$. The inner layer is so arranged that it is always behind the spaces or lines where the adjacent edges of the strip or strips forming the outer layer meet or nearly meet, and the outer layer, on the other hand, covers the openings or lines where the adjacent edges of the strip or strips forming the inner layer meet. By this arrangement nothing that is present on the roadway can penetrate within this cylinder so guarded. A sharp well-pointed tack cannot pierce the metal, neither can a piece of broken glass nor the like. The strips may be of an annular form. (Shown in Figs. 1, 2, 3, and 5.) In such event they are rings B, spun to shape or cut from thin tubing or cut from strips and bent around and their meeting ends riveted, as shown in Figs. 1, 2, 3, and 5. These rings B are held in place by being riveted or otherwise secured to a connecting-strip S, running longitudinally with the tire. Of these strips there are preferably two, and while they may be located at the sides of the tubing, as in Figs. 1, 2, and 3, they are preferably located the one at the innermost portion and the other at the outermost portion of the tubular metallic cylinder, substantially as indicated in Fig. 5. It is to be noted that these strips S are preferably of rubber.

In case the annular strips are continuous or continuous for some considerable portion of the tire they are arranged in the form of spirals, substantially as shown in Fig. 4, the one strip within the other, so as to break joints—that is, prevent gaps or openings in the tubular metallic structure. The metal of which these tubular structures is composed is flexibly elastic.

By either of the aforenamed constructions I provide for the tire a support which is elastic and yet so armored as to be proof against puncture.

With either of such tubular structures I combine a cover. This cover may be of the kind used in what is known as the "single-tire" tubing. In such event the tubular structure A is covered with the outer flexible covering D of this single tire, and the remainder or flexible tubing or stripping E of this single tire is located within this tubular structure. In other words, the latter is interposed between the outer covering D and the tubing E of this single tire. These coverings D and E are well known. They usually consist of rubber and a textile fabric or fiber combined therewith, all consolidated together to form a single tubing (tire) of homogeneous material. When combined with my tubular structure, as aforementioned, they and this metallic structure are duly connected, so as to keep together. For this reason, among others, they are preferably cemented together by the manufacturer of the tire at the time when the latter is made. The cover may consist of what is known as the "cover" in the double tire. In such event the cover D is usually one divided at the inner side and capable of being united by means of lacing L in the well-known manner. Within the tubular structure the inner tube E, which is present in the double tire, is present within the tubular structure. This tube E in the double tire is thicker and stronger than in the single tire, because it is expected to stand without necessary attachment to the cover D or (when present in my invention) to the tubular metallic structure. Each of the tires thus formed are to be filled with air introduced under pressure and retained therein under pressure by any of the ordinary and well-known means. As a result I provide a tire which is elastic and easy for the rider of the vehicle. The tire is noiseless. It is extremely durable. It does not admit of being punctured, so as to destroy its elasticity. If the tack, sharp stone, piece of glass, or other article in the roadway should puncture the cover, it cannot puncture the tubular metallic structure beneath (within) and next the cover. Consequently it cannot puncture the parts which protect the air-tube holding the compressed air. Therefore the latter will always act efficiently.

In cases where compressed air is not pumped into the (my) tire the latter will run with comparative ease, as the tubular elastic structure will remain and be very efficient. In such event the tubular elastic structure will require to be made stiffer or receive additional support.

What I claim as new and of my invention, and desire to secure by Letters Patent, is—

1. In an elastic tire, the combination of two series of thin elastic rings, one series within the other and located against the interspaces of the outer series, and a longitudinal tie of elastic material secured to the tire, adapted to stretch longitudinally, substantially as and for the purposes specified.

2. In an elastic tire, the combination of two series of thin elastic rings, each series formed of a metallic ribbon spirally wound, one series within the other and located against the interspaces of the outer series, and a longitudinal tie of elastic material secured to the tire adapted to stretch longitudinally, substantially as and for the purposes specified.

3. In an elastic tire, the combination of two series of thin elastic rings, one series within the other and located against the interspaces of the outer series, and a longitudinal tie of elastic material secured to the tire, adapted to stretch longitudinally, and an air-tube inside of this metallic tube, and a cover exterior thereto, substantially as and for the purposes specified.

PHILIP PITTON.

Attest:
SAMUEL A. WEST,
K. SMITH.